United States Patent
Chavez et al.

(10) Patent No.: US 8,775,562 B2
(45) Date of Patent: Jul. 8, 2014

(54) MAPPING FILE FRAGMENTS TO FILE INFORMATION AND TAGGING IN A SEGMENTED FILE SHARING SYSTEM

(75) Inventors: Timothy R. Chavez, Austin, TX (US); Christina K. Lauridsen, Austin, TX (US); Sushma B. Patel, Austin, TX (US); Robert R. Peterson, Austin, TX (US); Loulwa F. Salem, Austin, TX (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1661 days.

(21) Appl. No.: 11/761,526

(22) Filed: Jun. 12, 2007

(65) Prior Publication Data
US 2008/0133706 A1 Jun. 5, 2008

Related U.S. Application Data

(63) Continuation-in-part of application No. 11/566,835, filed on Dec. 5, 2006, now Pat. No. 8,131,673.

(51) Int. Cl.
*G06F 15/16* (2006.01)
*H04L 29/08* (2006.01)

(52) U.S. Cl.
CPC .... *H04L 29/08477* (2013.01); *H04L 29/08306* (2013.01); *H04L 67/06* (2013.01)
USPC ......................................................... 709/218

(58) Field of Classification Search
CPC .................. H04L 29/08306; H04L 29/08477; H04L 67/06

USPC ......................................................... 709/218
See application file for complete search history.

(56) References Cited

U.S. PATENT DOCUMENTS

| | | | |
|---|---|---|---|
| 5,337,044 | A | 8/1994 | Folger et al. |
| 7,203,741 | B2 | 4/2007 | Marco et al. |
| 7,761,569 | B2 | 7/2010 | Hopkins |
| 7,788,711 | B1 | 8/2010 | Sun et al. |
| 7,814,146 | B2 | 10/2010 | Chavez et al. |
| 7,822,711 | B1 | 10/2010 | Ranade |
| 8,131,673 | B2 | 3/2012 | Chavez et al. |

(Continued)

OTHER PUBLICATIONS

"A few things to consider while configuring Limewire for optimal performance . . ." posted on Gnutella forums by Murasame on Jul. 28, 2004.*

(Continued)

*Primary Examiner* — Boris Gorney
(74) *Attorney, Agent, or Firm* — Stephen R. Tkacs; Stephen J. Walder, Jr.; Steven L. Bennett

(57) ABSTRACT

A peer-to-peer file sharing client with background file sharing is provided in a segmented peer-to-peer file sharing network. A user may elect to "tag" a torrent when a new file is submitted to the peer-to-peer system. A user may view the various tags with one or more file fragments that the user is hosting in the background. The user may view the tags for all fragments being shared in the background and search the tags. The peer-to-peer system may store metadata tags for the torrents in a central repository, such as a relational database, or in a distributed hash table.

20 Claims, 10 Drawing Sheets

(56) References Cited

U.S. PATENT DOCUMENTS

| | | | |
|---|---|---|---|
| 8,204,791 | B2 | 6/2012 | Chavez et al. |
| 8,280,958 | B2 | 10/2012 | Chavez et al. |
| 2001/0037311 | A1 | 11/2001 | McCoy et al. |
| 2002/0055906 | A1 | 5/2002 | Katz et al. |
| 2002/0152299 | A1 | 10/2002 | Traversat et al. |
| 2002/0178255 | A1 | 11/2002 | Hobart |
| 2004/0024766 | A1 | 2/2004 | Chung |
| 2004/0059644 | A1 | 3/2004 | Blau |
| 2005/0203851 | A1* | 9/2005 | King et al. .................. 705/51 |
| 2006/0029093 | A1* | 2/2006 | Van Rossum ............... 370/432 |
| 2006/0123010 | A1* | 6/2006 | Landry et al. ................ 707/10 |
| 2006/0167855 | A1* | 7/2006 | Ishikawa et al. .............. 707/3 |
| 2006/0168318 | A1 | 7/2006 | Twiss |
| 2006/0173967 | A1 | 8/2006 | Jennings, III et al. |
| 2006/0179143 | A1* | 8/2006 | Walker et al. ............... 709/226 |
| 2006/0190715 | A1* | 8/2006 | Miller ......................... 713/150 |
| 2006/0200736 | A1 | 9/2006 | Smit et al. |
| 2006/0265436 | A1* | 11/2006 | Edmond et al. ............ 707/204 |
| 2007/0088622 | A1 | 4/2007 | Floyd |
| 2007/0088703 | A1* | 4/2007 | Kasiolas et al. .............. 707/10 |
| 2007/0162308 | A1 | 7/2007 | Peters |
| 2007/0180079 | A1 | 8/2007 | Wei et al. |
| 2007/0208748 | A1* | 9/2007 | Li .............................. 707/10 |
| 2008/0016160 | A1 | 1/2008 | Walter et al. |
| 2008/0016194 | A1* | 1/2008 | Chetuparambil et al. .... 709/223 |
| 2008/0063003 | A1 | 3/2008 | O'Neal |
| 2008/0133538 | A1 | 6/2008 | Chavez et al. |
| 2008/0133666 | A1 | 6/2008 | Chavez et al. |
| 2008/0133698 | A1 | 6/2008 | Chavez et al. |
| 2009/0106425 | A1 | 4/2009 | Zuckerman et al. |
| 2009/0157902 | A1 | 6/2009 | Saffre et al. |
| 2009/0276771 | A1 | 11/2009 | Nickolov et al. |
| 2010/0235432 | A1 | 9/2010 | Trojer |

OTHER PUBLICATIONS

Cohen, Bram, "Incentives Build Robustness in BitTorrent", http://www.bittorrent.com/bittorrentecon.pdf, May 22, 2003, pp. 1-5.

"Swarming Technology", Onion Networks, http://onionnetworks.com/technology/swarming/, printed Nov. 17, 2006, 3 pages.

BitTorrent, Wikipedia, http://en.wikipedia.org/wiki/Bittorrent, printed Nov. 17, 2006, 14 pages.

Malik, Om, "BitTorrent does legal P2P with NTL", GigaOmniMedia, Inc., http://gigiaom.com/2006/02/10/bittorrent-does-legal-p2p-with-ntl/, Feb. 10, 2006, 2 pages.

"Warner Bros. to sell films via BitTorrent", The Associated Press, MSNBC.com, http://www.msnbc.msn.com/id/12694081/print/1/displaymode/1098/, May 8, 2006, 2 pages.

"The Changing Face of BitTorrent", Computer Power User, Caught in the Web, vol. 5, Issue 11, http://www.computerpoweruser.com/Editorial/article.asp?guid=&article=articles/archive/c0511/46c11/46c11.asp/, Nov. 2005, 2 pages.

Cooper, Mark, "Lamabox—the P2P Video set-top box", PVR Hardware Database, Jan. 19, 2006, http://pvrhw.goldfish.org/tiki-read_article.php?articleId=59, 2 pages.

"Our goal: to understand protein folding, misfolding, and related diseases", Stanford University, Folding@home distributed computing, http://folding.stanford.edu, printed Nov. 17, 2006, 3 pages.

"SETI@home", University of California, 2006, http://setiathome.ssl.berkeley.edu/, 1 page.

"Project RC5", distributed.net, http://www.distributed.net/rc5/, printed Nov. 17, 2006, 2 pages.

"BandwidthSwitcher", halfbakery, http://www.halfbakery.com/idea/BandwidthSwitcher#1002577095, printed Nov. 17, 2006, 4 pages.

"P2P Internet", halfbakery, http://www.halfbakery.com/idea/P2P_20Internet#1092502800, printed Nov. 17, 2006, 3 pages.

mldonkey, a multi-networks file-sharing client—Tasks: task #4381, Free Software Foundation, Inc., http://savannah.nongnu.org/task/?4381, printed Nov. 21, 2006, 6 pages.

"Metainfo File Structure", TheoryOrg, BitTorrentSpecification, BitTorrent Protocol Specification v1.0, Section 7, http://wiki.theory.org/BitTorrentSpecification, printed Nov. 21, 2006, 19 pages.

"A user-friendly,P2P-social-tagging-capable Wiki as part of Edgy Eft", https://features/launchpad.net/ubuntu/+spec/easy-to-use-wiki, printed Jun. 8, 2009, 2 pages.

"BitTorrent Wish List", http://wiki.theory.org/BitTorrentWishList, 1 page.

"Distributed Hash Table", Wikipedia, http://en.wikipedia.org/wiki/Distributed_hash_table, 1 page.

"Tagged with "BitTorrent"", http://odeo.com/tags/bittorrent, printed Jun. 8, 2009, 3 pages.

"Tags / p2p", http://technorati.com/tag/p2p, printed Jun. 8, 2009, 2 pages.

Clarke, Ian, "A Distributed Decentralised Information Storage and Retrieval System", University of Edinburgh, 1999, 45 pages.

Clarke, Ian et al., "Protecting Free Expression Online with Freenet", IEEE Internet Computing, 2002, 10 pages.

Cohen, Bram, "The BitTorrent Protocol Specification", http://www.bittorrent.org/beps/bep_0003.html, 2008, 6 pages.

Ernesto, "Tribler: A social based, BitTorrent powered p2p network", http://torrentfreak.com/tribler-a-socialbased-bittorrent-powered-p2p-network, Feb. 22, 2006, 9 pages.

Golle, Philippe et al., "Incentives for Sharing in Peer-toPeer Networks", ACM Conference on Electronic Commerce (EC-2001), 2001, pp. 1-18.

Legout, Arnaud et al., "Rarest First and Choke Algorithms are Enough", ACM, Oct. 2006, 14 pages.

Pouwelse, J. A. et al., "Tribler: A social-based Peer-to-Peer system", http://iptps06.cs.ucsb.edu/papers/Pouw-Tribler06.pdf, The 5th International Workshop on Peer-to-Peer Systems, Santa Barbara, California, Feb. 27-28, 2006, 6 pages.

U.S. Appl. No. 13/368,410.

* cited by examiner

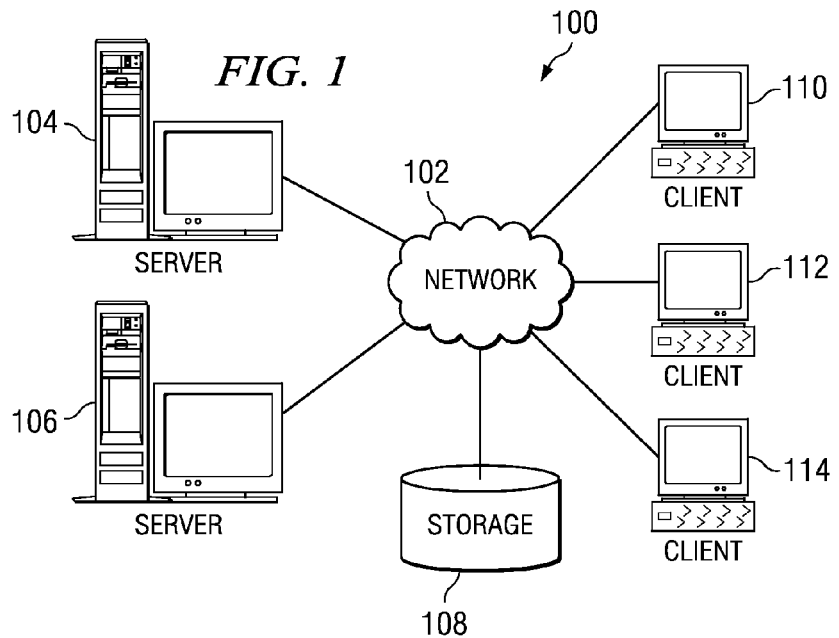

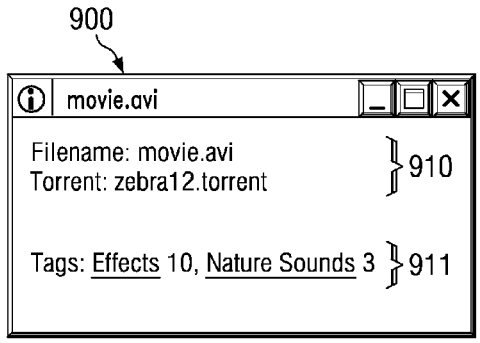

FIG. 9

| KEY | VALUE |
|---|---|
| BLACK.TORRENT | ALTERNATIVE, 12, MUSIC, 890, 90'S, 34 |
| TEXT021.TORRENT | HISTORY, 32, GREEK HISTORY, 5 |
| IMAGE011.TORRENT | IMAGE, 10 |
| DICTIONARY.TORRENT | DICTIONARY, 909 |
| ZEBRA12.TORRENT | EFFECTS, 10, NATURE SOUNDS, 3 |

FIG. 10

| KEY | VALUE |
|---|---|
| ALTERNATIVE | BLACK.TORRENT, DAUGHTER.TORRENT ... |
| HISTORY | ANCIENT_GREECE.TORRENT ... |
| IMAGE | NOVA.TORRENT, CLIPART.TORRENT ... |
| DICTIONARY | DICTIONARY.TORRENT ... |
| NATURE SOUNDS | ZEBRA12.TORRENT, FISHING.TORRENT ... |

FIG. 12

| KEY | VALUE |
|---|---|
| 1932081 | DAUGHTER.TORRENT |
| 9243532 | ANCIENT_GREECE.TORRENT |
| 3523532 | CLIPART.TORRENT |
| 4574745 | DICTIONARY.TORRENT |
| 5675675 | FISHING.TORRENT |

FIG. 13

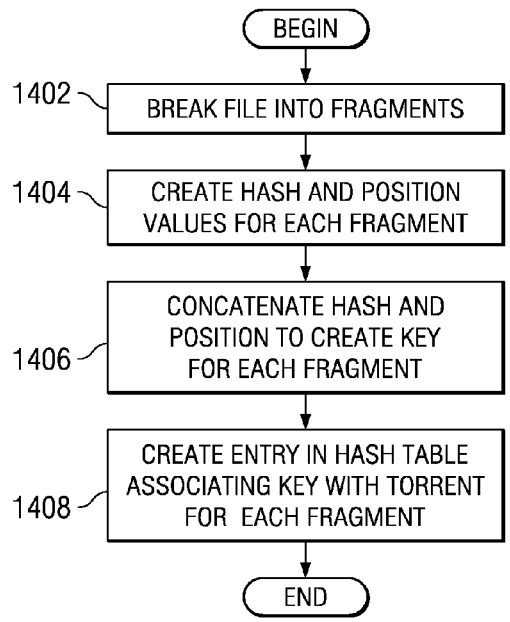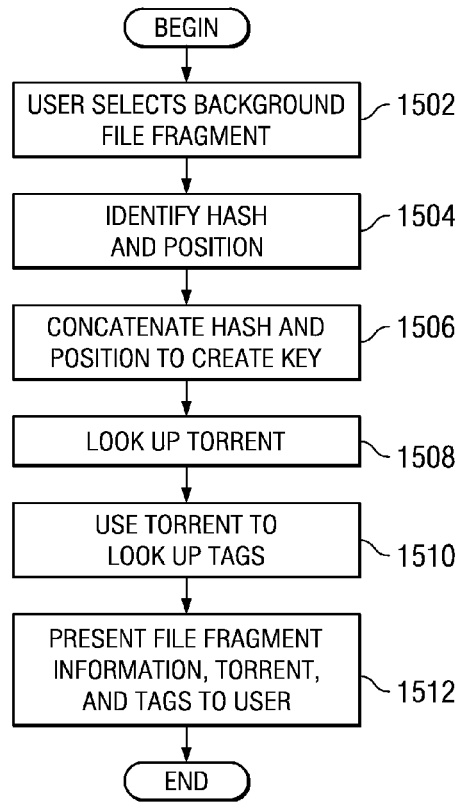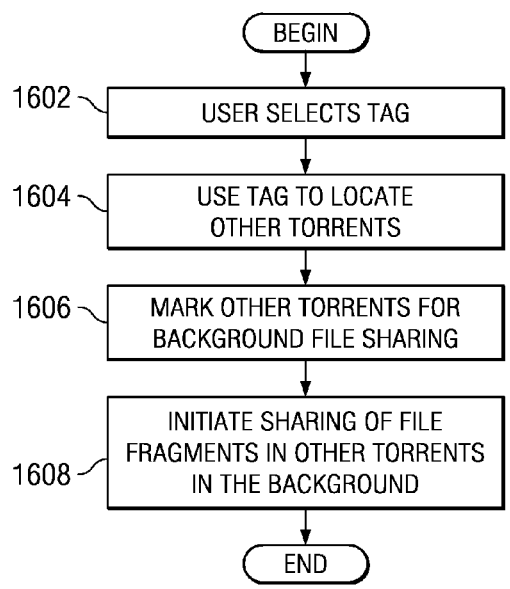
FIG. 14
FIG. 15
FIG. 16

MAPPING FILE FRAGMENTS TO FILE INFORMATION AND TAGGING IN A SEGMENTED FILE SHARING SYSTEM

BACKGROUND

1. Technical Field

The present application relates generally to an improved data processing system and method. More specifically, the present application is directed to mapping file fragments to file information and tagging in a segmented file sharing network.

2. Description of Related Art

Peer-to-peer file sharing programs are designed to widely distribute large amounts of data, while minimizing costly server and bandwidth resources. Peer-to-peer (P2P) systems, such as the BITTORRENT P2P file sharing system, have gained a wide following. P2P systems have recently been put to commercial use through partnerships with content providers, such as media and cable companies. P2P networks are gaining credibility as a means for legal revenue generating activity—creating a need for methods to rapidly optimize content delivery.

In one implementation, a file is made available for P2P download by providing a link to file information, often stored on a hypertext transport protocol (HTTP), or Web, server. In the BITTORRENT file sharing system, this file information is referred to as a "torrent." The file information may include, for example, file name, file length, and hashing information.

The file information may also include the address of a tracker, which is a device in the P2P network that helps downloaders (peers) to find each other. Peers communicate with the host of the file information and the tracker using a simple protocol layered on top of HTTP. Each peer sends information about what file it is downloading, on what port it is listening, and other information. The tracker responds with a list of contact information for peers that are downloading the same file. However, the communication between a peer and a tracker requires much less bandwidth than a direct server-to-client file download.

In a typical P2P implementation, a file is divided into pieces of fixed size, e.g., 256 KB. Each downloader reports to its peers what pieces it has. Also, each downloader, at some point, uploads file pieces, also referred to as segments or fragments, to its peers. Whenever, a downloader finishes downloading a file fragment, the P2P client software performs a hash of the file fragment and compares the hash to an expected hash value, received in the file information, to determine if the file fragment downloaded correctly and has not been corrupted. If the file fragment downloads correctly, then the client reports to its peers that it has the file fragment available for upload.

At least one peer must start with the whole file. This peer is referred to as a "seed." Eventually other peers will possess the whole file, or at least every file fragment will be found on at least one client. Some peers may leave the network before possessing the whole file, while others may remain in the network well after completing retrieval of the file. The goal is to balance downloading clients with uploading clients.

Several techniques or policies may be used to ensure that it is possible to download the entire file. For example, the tracker may return a random list of peers to each new participant in the download. As another example, P2P clients may attempt to request the rarest file fragment first. As more peers request the rarest file fragment, another file fragment becomes the rarest, and so forth. This technique helps to equally distribute the demand for particular file fragments. Other techniques, such as "random first" and "endgame mode" may be used; however, they are not a focus of this disclosure and will not be discussed in detail.

Content distribution among peers increases in efficiency with the number of peers who are sharing that content on a network. A network of peers participating in distributing a particular file is referred to as a "swarm." Swarms are formed around the retrieval of a particular file and are comprised of peers retrieving (downloading) and sharing (uploading) file fragments simultaneously. The larger the swarm, the faster the per-peer retrieval of that file, and the more distributed the bandwidth cost becomes for each participant client device.

SUMMARY

The illustrative embodiments described herein recognize the disadvantages of the prior art and provide a mechanism for background file sharing in a segmented peer-to-peer file sharing network. Each file sharing participant may designate an amount of bandwidth and/or storage space for background file sharing. Peer-to-peer file sharing clients then share file data and content in the background automatically. The client may participate in additional swarms, in the background, to generally increase the number of peers in file sharing networks, thus increasing the speed of downloading desired files for other users.

A user may elect to "tag" a torrent when a new file is submitted to the peer-to-peer system, i.e. when the torrent is first created, when a user is in the process of downloading the file corresponding to the torrent, or when a user is sharing a fragment of the file in the background. A user may view the various tags with a torrent and their popularity (or tag count) at any time by simply providing the location of the torrent to the peer-to-peer client. Additionally, in a background peer-to-peer system, the user may view the tags associated with one or more file fragments that the user is hosting in the background. The user may view the tags for all fragments being shared in the background and search the tags.

The peer-to-peer system may store metadata tags for the torrents in a central repository, such as a relational database, or in a distributed hash table. In order to provide tagging information for a particular file fragment in a background peer-to-peer client, the system may associate a file fragment with its corresponding torrent. The peer-to-peer client may create a key for a file fragment by concatenating a hash value and a position value that are received with the file fragment. The peer-to-peer client may then associate the key with the torrent in a database or hash table.

In one illustrative embodiment, a method in a peer-to-peer file sharing client data processing system for background file sharing in a peer-to-peer file sharing network comprises allocating background resources in the peer-to-peer file sharing client data processing system for background file sharing comprising a specified amount of bandwidth and a specified amount of storage space to be used for background file sharing and growing a background swarm by requesting, by the peer-to-peer file sharing client data processing system, at least one file fragment for a file from the background swarm for background file sharing such that the at least one file fragment becomes available to be distributed from the peer-to-peer file sharing client data processing system to peer data processing systems in the background swarm. The method further comprises receiving, by the peer-to-peer file sharing client data processing system, the at least one file fragment from the background swarm for background file sharing of a file using at least a portion of the specified amount of bandwidth and temporarily storing, by the peer-to-peer file sharing client data processing system, the at least one file fragment in at least a portion of the specified amount of storage space. The method further comprises, for a given file fragment within the at least one file fragment, identifying a key value, and looking up file information for the given file fragment using the key value. The file information includes tags assigned to the file. The method further comprises presenting the file information to a user. The at least one file fragment is part of a file that is not being downloaded in the foreground.

In another illustrative embodiment, a peer-to-peer file sharing client for background file sharing in a peer-to-peer file sharing network comprises a processor and a memory coupled to the processor. The memory contains instructions which, when executed by the processor, cause the processor to allocate background resources in the peer-to-peer file sharing client for background file sharing comprising a specified amount of bandwidth and a specified amount of storage space to be used for background file sharing and grow a background swarm by requesting at least one file fragment for a file from the background swarm for background file sharing such that the at least one file fragment becomes available to be distributed from the peer-to-peer file sharing client to peer data processing systems in the background swarm. The instructions further cause the processor to receive the at least one file fragment from the background swarm for background file sharing of a file using at least a portion of the specified amount of bandwidth and temporarily store the at least one file fragment in at least a portion of the specified amount of storage space. The instructions further cause the processor to, for a given file fragment within the at least one file fragment, identify a key, look up file information for the given file fragment using the key, wherein the file information includes tags assigned to the file, and present the file information to a user. The at least one file fragment is part of a file that is not being downloaded in the foreground.

In a further illustrative embodiment, a computer program product comprises a computer readable storage medium having a computer readable program stored therein. The computer readable program, when executed on a peer-to-peer file sharing client data processing system, causes the peer-to-peer file sharing client data processing system to allocate background resources in the peer-to-peer file sharing client data processing system for background file sharing comprising a specified amount of bandwidth and a specified amount of storage space to be used for background file sharing and grow a background swarm by requesting at least one file fragment for a file from the background swarm for background file sharing such that the at least one file fragment becomes available to be distributed from the peer-to-peer file sharing client data processing system to peer data processing systems in the background swarm. The computer readable program further causes the peer-to-peer file sharing client data processing system to receive the at least one file fragment from the background swarm for background file sharing of a file using at least a portion of the specified amount of bandwidth and temporarily store the at least one file fragment in at least a portion of the specified amount of storage space. The computer readable program further causes the peer-to-peer file sharing client data processing system to, for a given file fragment within the at least one file fragment, identify a key, look up file information for the given file fragment using the key, wherein the file information includes tags assigned to the file, and present the file information to a user. The at least one file fragment is part of a file that is not being downloaded in the foreground.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts a pictorial representation of an exemplary distributed data processing system in which aspects of the illustrative embodiments may be implemented;

FIG. 2 is a block diagram of an exemplary data processing system in which aspects of the illustrative embodiments may be implemented;

FIG. 9 illustrates an example file fragment information display in accordance with an illustrative embodiment;

FIG. 10 illustrates a table that associates tags with a torrent in accordance with an illustrative embodiment;

FIG. 12 illustrates a table that associates torrents with a tag in accordance with an illustrative embodiment;

FIG. 13 illustrates a table that associates file torrents with file fragments in accordance with an illustrative embodiment;

FIG. 14 is a flowchart illustrating operation of a peer-to-peer client when breaking a file into fragments for distributed file sharing in a segmented file sharing network in accordance with an illustrative embodiment;

FIG. 15 is a flowchart illustrating operation of a peer-to-peer client for presenting file fragment information for a fragment being shared in the background in accordance with an illustrative embodiment; and FIG. 16 is a flowchart illustrating operation of a peer-to-peer client for including torrents for background file sharing based on tag information in accordance with an illustrative embodiment.

DETAILED DESCRIPTION OF THE ILLUSTRATIVE EMBODIMENTS

Figure 3:
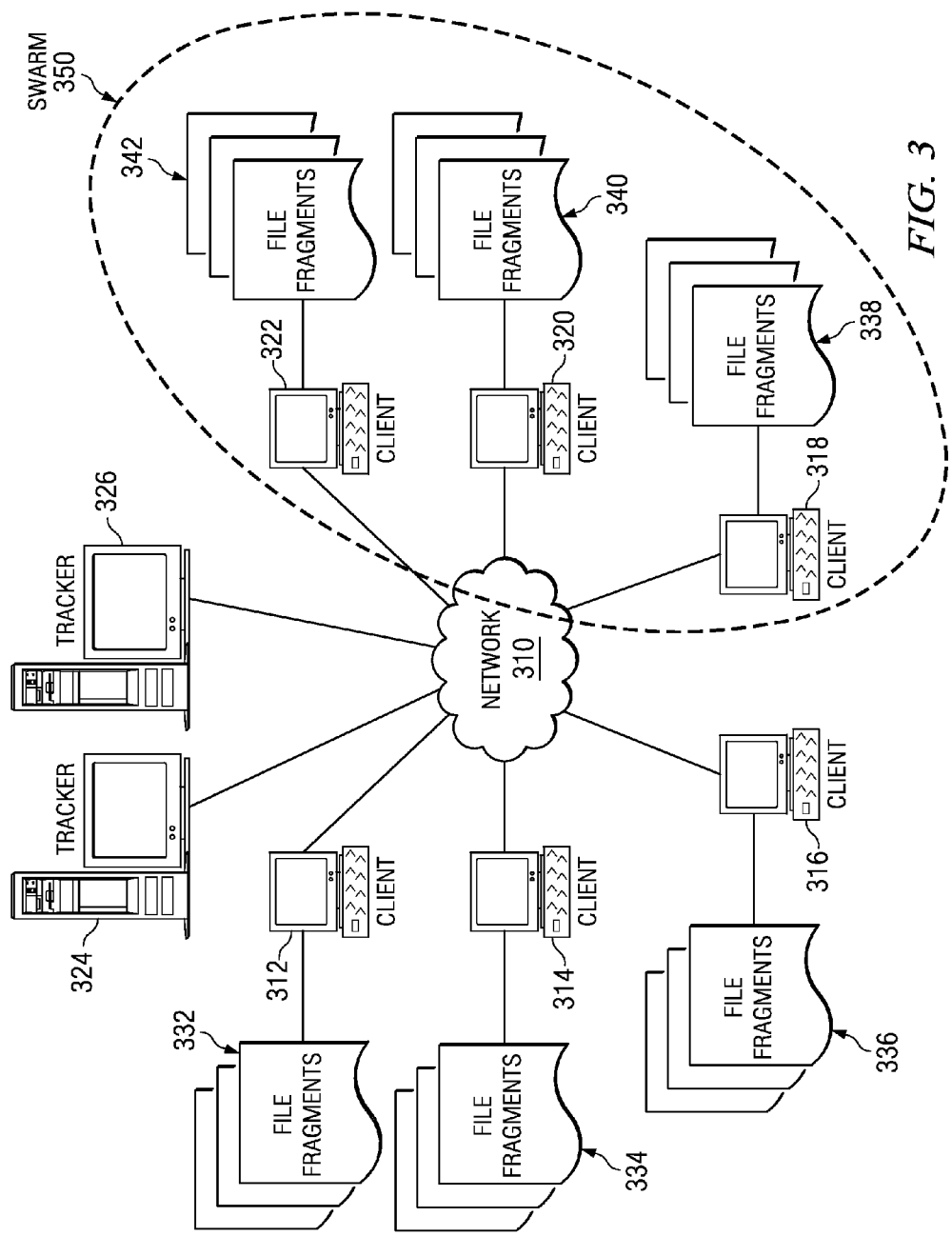
FIG. 3 depicts a pictorial representation of a segmented file sharing network in accordance with an illustrative embodiment.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In one illustrative embodiment, server 104 may provide access to a Web page or other content that contains a link to file information for a given file. Server 106 may be a tracker for the file. Clients 110-114 may have peer-to-peer (P2P) file sharing clients that participate in downloading the given file.

More particularly, clients 110 and 112 may already be members of a swarm, each downloading file fragments from and uploading file fragments to peers in the swarm. A user at client 114 may click on the link, which results in the P2P client software downloading file information including, for example, file name, file length, hashing information, and an address of the tracker at server 106. The address of the tracker may be a uniform resource locator (URL), for instance.

The P2P client software at client 114 may then contact the tracker at server 106, which, in turn, responds with addresses of clients 110, 112. Client 114 then establishes communication with clients 110, 112, and begins downloading file fragments. As client 114 downloads file fragments, it reports the file fragments it has available for upload to the other peers in the swarm.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The efficiency of content distribution increases relative to the number of peers who are sharing that content. The peers are segmented in the file sharing network. Swarms are formed around the retrieval of a particular file. If the number of peers sharing a file is too low, then the number of peers having a given file fragment may be low as well. As a result, a P2P client that has a rare file fragment available for upload may receive a high number of requests for that file fragment, and the bandwidth is not ideally distributed among the peers. Increasing the number of peers in a swarm helps to more evenly distribute the bandwidth costs.

In accordance with the illustrative embodiments, a peer-to-peer file sharing system is provided in which participant clients make an amount of storage space and bandwidth available for background file sharing. That is, a P2P client may participate in a swarm even if the user of that client did not explicitly request that file. In this manner, swarms are grown without the need to advertise a file, through a Web site, for example. Peers may participate in a swarm by sharing file fragments in the background without attempting to possess the entire file.

Normally, in the prior art, a swarm is formed around a particular file out of want, or "pull," so the swarm is defined by all users wanting that file. However, in accordance with the illustrative embodiments, a swarm may also be formed based on storage space and bandwidth available for sharing information, either file fragments or some other information about the file. The net effect is a larger swarm, a higher density of participation, and more evenly distributed bandwidth costs.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 depicts a pictorial representation of a segmented file sharing network in accordance with an illustrative embodiment. Clients 312-322 are connected to network 310. Trackers 324, 326 are responsible for helping clients 312-322 find each other to form segmented networks, or "swarms," of peers for downloading/uploading particular files. Clients 312-322 possess file fragments 332-342, respectively.

In the depicted example, clients 318, 320, 322 are part of swarm 350. Clients 312, 314, 316 may be participants of other swarms. In accordance with an illustrative embodiment, clients 312, 314, 316 may provide bandwidth and storage space for background file sharing. That is, client 316, for instance, may take part in swarm 350 without a user at client 316 expressly requesting the file being distributed in swarm 350.

Figure 4:
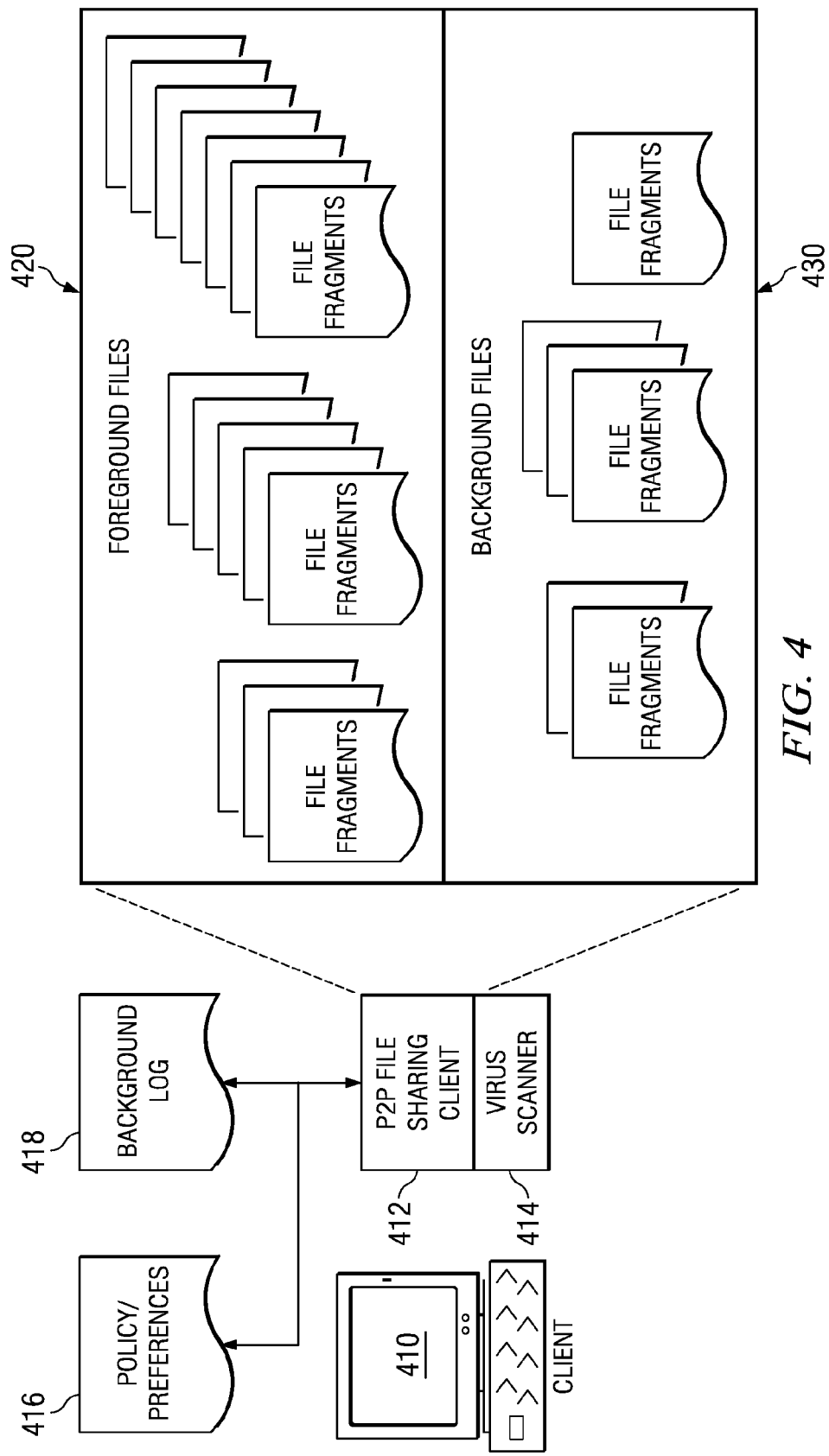
FIG. 4 is a block diagram illustrating a configuration of a peer-to-peer client with background file sharing in accordance with an illustrative embodiment.

FIG. 4 is a block diagram illustrating a configuration of a peer-to-peer client with background file sharing in accordance with an illustrative embodiment. Client 410 includes peer-to-peer (P2P) file sharing client 412 and virus scanner 414. When a user of client 410 selects a file for download, P2P client 412 contacts the tracker, receives a list of peers, and requests file fragments.

Files that are expressly requested by a user, or otherwise being of express interest to the user, are downloaded in the foreground. For example, a user may subscribe to a particular group, and, thus, may automatically retrieve files being shared by that group. As another example, the client may be programmed to retrieve any new episode of a particular video broadcast or any new music from a particular artist. File fragments for these files are stored in foreground files 420.

Note that content being distributed in the peer-to-peer network, as described herein, is managed content. P2P client 412 may include functionality for preventing illegal distribution or receipt of copyrighted content. For example, P2P client 412 may validate a digital signature of a file with a trusted third party. However, preventing illegal distribution is not a focus of this disclosure, and such functionality will not be discussed in detail.

In accordance with the illustrative embodiment, P2P client 412 also receives and shares file fragments in the background to grow swarms in which the user of client 410 is not expressly interested. In other words, P2P file sharing client 412 may automatically share file fragments without the user manually requesting the download. The user may not intend to view the content and does not need to monitor the background file sharing. P2P client 412 stores file fragments that are downloaded in the background in background files 430.

The file fragments in foreground files 420 are downloaded with the express purpose of possessing the entire file, although a user may cancel a download without ultimately possessing the entire file. On the other hand, the file fragments in background files 430 will likely never result in the entire file being downloaded. Rather, file fragments in background files 430 may be only the most rare file fragments, may expire after a specified period of time, or may remain small in number due to storage or bandwidth limits specified by the user.

For security, background files 430 may be a portion of storage that is partitioned to a defined space on a storage device within client 410, where it cannot be executed. Virus scanner 414 may be applied to background files 430, or perhaps all content within foreground files 420 and background files 430.

In one exemplary embodiment, P2P file sharing client 412 may select peers based on protocol/client. When a downloader participates in a swarm, it receives information in the background, such that it can participate as a peer in other swarms. This may include all users of a particular P2P protocol or client. For example, if P2P file sharing client 412 is a BITTORRENT client, then P2P client 412 may participate with any other swarms it discovers, in the background, as long as the peers in the other swarms are BITTORRENT clients communicating using the BITTORRENT protocol.

In another embodiment, P2P file sharing client 412 may also select peers for background file sharing based on user-selected communities. Users may opt-in to support particular communities, rather than sharing files at random. For example, if the file sharing system encompasses a community of artists, the members of that community may use P2P file sharing to share high-resolution images and media of art with each other. A particular peer subscribed to the community may have pieces of all different media on the client device that are of no particular interest to the user, but the P2P client hosts those file fragments to help provide a high-quality distribution channel to everyone in the community.

P2P client 412 may have user-defined limits on the amount of storage and/or bandwidth available for background file sharing. Oldest file fragments, least recently requested file fragments, or least frequently requested file fragments may be overwritten such that the most relevant content is always available within a limited storage space.

P2P client 412 may store a background log 418, which may contain file fragment information, torrent information, and tag information for file fragments that were shared in the background. Because file fragments may be deleted or overwritten, background log 418 allows the user to view a history of background sharing activity. Background log 418 may include tag information, which will be discussed in further detail below.

P2P client 412 may also allow the user to select trusted peers. The P2P file sharing system may then build trust among peers, for example, by sharing a list of trusted peers that can be modified by each client according to their relationships. Users may also build lists of peers that are known to be malicious (blacklist).

Information about the policy and preferences under which P2P file sharing client 412 operates may be stored in policy/preferences data structure 416. Thus, policy/preferences data structure 416 may store security policies or preferences, peer selection policies or preferences, storage/bandwidth limits, a list of trusted peers, or a list of blacklisted peers, as described above.

Figure 5:
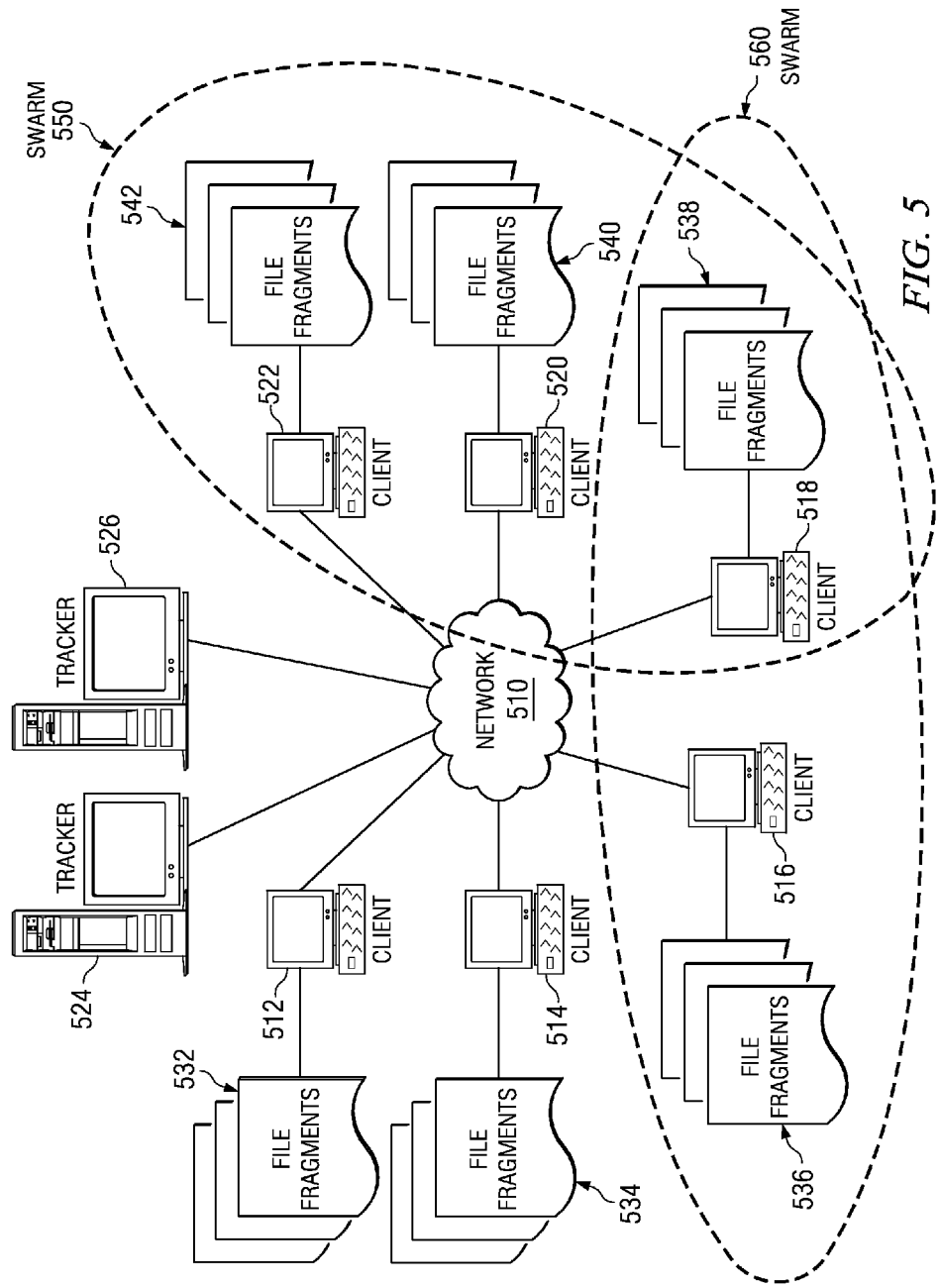
FIG. 5 depicts a pictorial representation of a segmented file sharing network with background file sharing in accordance with an illustrative embodiment.

FIG. 5 depicts a pictorial representation of a segmented file sharing network with background file sharing in accordance with an illustrative embodiment. Clients 512-522 are connected to network 510. Trackers 524, 526 are responsible for helping clients 512-522 find each other to form segmented networks, or "swarms," of peers for downloading/uploading particular files. Clients 512-522 possess file fragments 532-542, respectively.

In the depicted example, clients 518, 520, 522 are part of swarm 550. In addition, clients 516, 518 are part of swarm 560. Clients 512-522 may be participants of other swarms. In accordance with an illustrative embodiment, client 516 may provide bandwidth and storage space for background file sharing. That is, client 516, for instance, may take part in swarm 550 without a user at client 516 expressly requesting the file being distributed in swarm 550.

What files, or file fragments, are shared in the background can vary based on the community model utilizing the background file sharing technique of the illustrative embodiments. In one exemplary embodiment, a central server and/or provider (not shown) may record and control where files and file fragments exist on the network. This central provider may send commands to peers 512-522 indicating which files to request from other peers in the network in order to increase swarm size, especially for more popular files.

In another exemplary embodiment, the distribution method allows peers 512-522 to trade file segments based on the rarity of the segments in each swarm. In this case, the actual information being distributed among peers is the file itself. When a peer joins a swarm, it begins retrieving the file and sharing it with other peers at the same time. When a peer receives a piece of the file, it exchanges a piece of another file in the background based on the rarity of the piece it received. For example, in exchange for receiving a file fragment that is N rare from client 520, client 516 may trade 5 file fragments that are each N/5 rare. In an alternative embodiment, P2P clients may share file fragments without considering the rarity of the file fragments. For example, P2P clients may share file fragments at random or based on relative/comparable size.

In a community where the swarms (and files) are contained and controlled, file fragments given to a peer in the background are likely to be relevant and useful to another peer. For example, in a P2P file sharing system within a work environment, there is a high probability that files or file fragments shared in one swarm will be relevant to another swarm. In any event, how often a trade for file fragments is performed between two peers is trivial as long as another swarm is able to gain a peer with which the swarm may share at least one piece.

Once a background peer receives a small number of file fragments, that peer will likely only be uploading in the background; it will not be receiving in that swarm until it can assist the swarm with other rare file fragments. For example, client 516 may receive and host a small number of rare file fragments for swarm 550. Client 516 will not receive any more file fragments for swarm 550 until those file fragments expire, are no longer rare, or peers in swarm 550 drop out of the swarm leaving even rarer file fragments. Alternatively, client 516 may receive and host a small number of file fragments until they expire, and then cease background file sharing in swarm 550 altogether, for example.

In fact, a peer sharing in the background may also share parts of the swarm in which it is participating in the foreground, automatically increasing the size of its own swarm. For instance, client 516 may host file fragments for background file sharing in swarm 550; however, clients 518-522 may also host file fragments for swarm 560 to grow the size of that swarm. If both swarms are the same size, background file sharing may nearly double the size of both swarms.

Background file fragments may expire after a given amount of time or contribution percentage. The background may be fully configurable by the peer to control how much space can be used for background sharing, how much bandwidth can be used for background sharing, how much of a file can be shared in the background, a minimum rarity for file fragments to be hosted in the background, number of background swarms in which to participate, etc.

Presumably, the P2P file sharing protocol or client algorithm may dictate that the rarest pieces of a swarm are to be sent to the background peers to make them less rare. The first link between two swarms may be made by at least one peer that is "intentionally" interested in both swarms. That peer, the user of which requests both files, may then propagate background sharing information (file information) to the other peers in both swarms.

Rather than trading actual content, peers may trade file names or file fragment identifiers. Upon receiving a new file name or identifier, a peer may request that file from the network, either in the background or the foreground. For example, once client 516 begins background file sharing in swarm 550, client 516 may propagate file information for files it possesses to all or a portion of the peers in swarm 550. Those clients now have the file information for a file without the user having to find that file advertised on a Web site, for example.

Each peer must know which files, or file fragments, to download in the background. One way to distribute this information is to pass a list between peers in the network that is populated with the names of the files that currently reside on each user's local system. Once a peer receives the list from another peer, it may select files or fragments from the list to request from the list sender or from all connected peers in that swarm. The file list could piggyback onto a file fragment that is transferred as a result of a manual client request.

Alternatively, a P2P client may pass a list of files to download based on known rare segments or popular files within the network. Rather than passing a list of files on the peer systems, the list may contain file fragments that were rarest at the time of a previous download. Alternatively, the list may contain identifiers of files recently requested by peers with counters that increase when more than one peer who has held the list has recently requested the same content. These lists may be based on manual user requests or on background requests. Each client may manipulate the list and pass it on. In an alternative embodiment, the list may be sent by a tracker to a peer.

In another exemplary embodiment, the P2P client may share files based on similar files shared within the swarm. Similar to Web sites that provide "users who purchased X also purchased Y" information, the P2P client may share files in the background according to correlated features, such as "artist" for music or a download timestamp within a certain range. When a user manually requests a file, background sharing may be initiated for files that are in some way correlated to that file. Those file fragments are likely to also be requested within that given swarm.

In yet another exemplary embodiment, a P2P client may share files using file lists obtained from a peer file-list-swap or a central provider (not shown). Peers may determine which files to request for background download based on pattern matching between a user attribute or timestamp and a particular data sequence in the file name. Matching strings could include particular bit sequences contained in either the original strings or hashes/checksums of the original strings.

Figure 6:
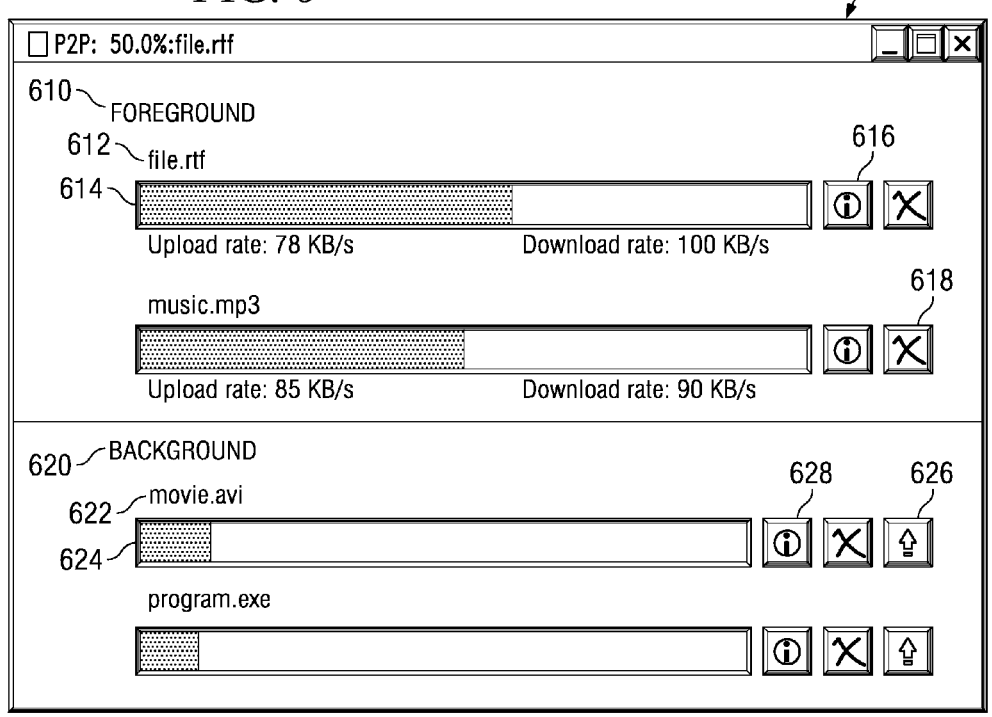
FIG. 6 depicts an example screen of display for a peer-to-peer client with background file sharing in accordance with an illustrative embodiment.

FIG. 6 depicts an example screen of display for a peer-to-peer client with background file sharing in accordance with an illustrative embodiment. Peer-to-peer (P2P) client window 600 includes a foreground download portion 610 and a background download portion 620.

Foreground portion 610 presents files that are being downloaded in the foreground, e.g. files that were expressly requested by a user of the P2P client. For each file, foreground download portion 610 presents file name 612 and progress bar 614. Also for each file being downloaded in the foreground, portion 610 presents an information control 616 and a cancel control 618. Responsive to the user selecting information control 616, the P2P file sharing client may present information about the file, such as the file name, file size, and so forth. Responsive to the user selecting cancel control 618, the P2P file sharing client may cease downloading of the file; however, the client may continue to upload file fragments it possesses to the peers in the swarm.

Background portion 620 presents files that are being downloaded in the background. For each file, background portion 620 presents a file name 622 and a progress bar 624. In one embodiment, progress bar 624 may present the progress with respect to the file size; however, background downloads are very unlikely to result in the entire file being downloaded. In fact, the purpose of background file sharing is to host a small number of rare file fragments for upload without a significant amount of download from the swarm. Therefore, progress bar 624 may represent other information, such as the percentage of background storage space used for the file, the percentage of background bandwidth used for uploading, contribution percentage, progress toward expiration, etc.

In addition to information and cancel controls, background portion 620 may also present a foreground control 626. The user of the P2P file sharing client may view the file information and may wish to possess the entire file. The user may then select foreground control 626, responsive to which the P2P client may move the file from background portion 620 to foreground download portion 610. The P2P client may then move the file fragments it possesses to foreground storage and begin requesting file fragments until the client possesses the entire file.

Figure 7:
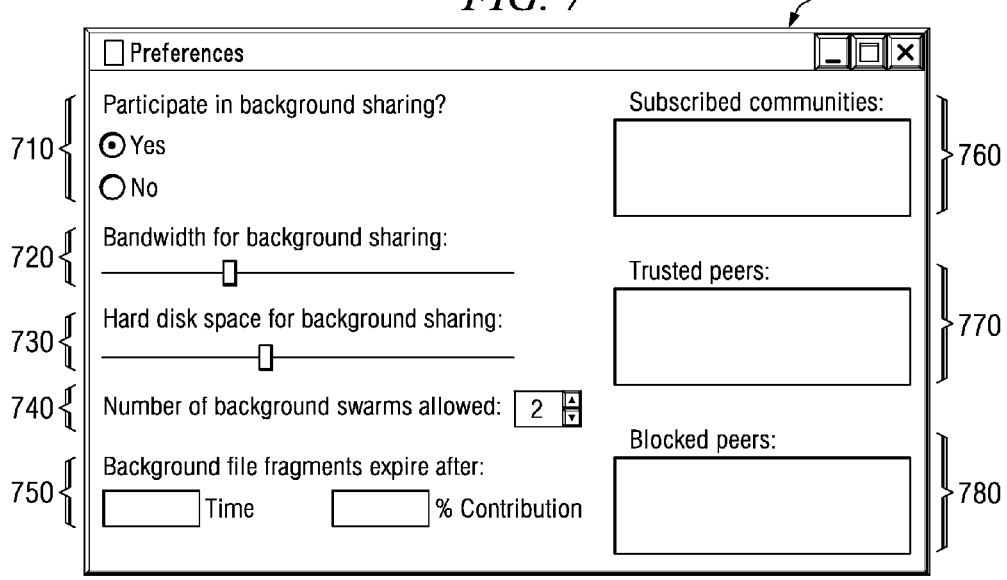
FIG. 7 depicts an example screen of display for a preferences user interface in accordance with an illustrative embodiment.

FIG. 7 depicts an example screen of display for a preferences user interface in accordance with an illustrative embodiment. Preferences user interface dialog 700 presents controls that allow a user to enter policy and preferences information to control the behavior of a peer-to-peer (P2P) file sharing client.

In the depicted example, control portion 710 presents a radio button control with which the user may opt-in or opt-out of background file sharing. If the user selects the "No" radio button in control portion 710, then the P2P file sharing client will not participate in background file sharing. In this instance, the "Yes" radio button is selected.

Control portion 720 presents a slider control with which the user may specify an amount of bandwidth to be used for background file sharing. Although a slider control is shown, other user interface controls may be used, such as text fields, dial controls, and the like. Alternatively, the amount of bandwidth to be used for background file sharing may be determined dynamically, based on an amount of bandwidth used for foreground file sharing, bandwidth used for other applications, time of day, whether the client device is idle, and so forth.

Control portion 730 presents a slider control with which the user may specify an amount of disk space to be used for background file sharing. Although a slider control is shown, other user interface controls may be used, such as text fields and the like. Alternatively, the amount of disk space to be used for background file sharing may be determined dynamically, perhaps in conjunction with the specified amount, based on the amount of available disk space, the amount of disk space used for foreground file sharing, etc.

Control portion 740 presents an input control with which the user may specify a number of background swarms allowed. Alternatively, the number of background swarms may be determined dynamically, perhaps in conjunction with the specified number, based on the number of foreground swarms, the amount of processing resources being used for other applications, and the like.

Control portion 750 presents controls with which the user may specify expiration parameters for background file fragments. The user may specify expiration parameters in units of time or according to percentage of contribution. Alternatively, the P2P client may expire background file fragments using other parameters, such as most commonly available in the swarm, least recently requested, least frequently requested, and so forth.

Control portion 760 presents an input control with which the user may specify communities to which the user subscribes. Thus, the user may subscribe to a community of musicians or amateur film makers, and whenever a file is being distributed in a specified community, the P2P client may participate in background file sharing to help grow the swarms for those communities. The user may enter the names of the communities directly using text, or may use other selection controls that are generally known in the art.

Control portion 770 presents an input control with which the user may specify a list of trusted peers. The user may enter the names, usernames, addresses, or the like of trusted users, such as friends or co-workers, for example. Thus, when one of the trusted peers begins sharing files in a swarm, the P2P client may participate in background file sharing to help grow the swarms for the trusted peers. The user may enter the names, usernames, addresses, etc. of trusted peers directly using text, or may use other generally known selection controls.

Control portion 780 presents an input control with which the user may specify a list of blocked peers. The user may enter the names, usernames, addresses, or the like of users that are known to provide malicious or illegal content, for example. Thus, when the P2P client participates in background, or foreground, file sharing to grow a swarm, the client may refuse to receive file fragments from or provide file fragments to peers in the blocked peers list. The user may enter the names, usernames, addresses, etc. of blocked peers directly using text, or may use other generally known selection controls.

In one exemplary embodiment, preferences user interface dialog 700 may include a control portion (not shown) that presents an input control with which the user may specify a list of tags. Thus, the user may specify particular tags, and whenever a file is being distributed having one or more tags that match, the P2P client may participate in background file sharing to help grow the swarm for that file. The user may enter the tags directly using text, or may use other selection controls that are generally known in the art. Alternatively, the user may specify tags that are to be blocked from background file sharing. For example, a user may decide not to participate in background file sharing for files with "movie" as a tag to avoid being an accessory to copyright violation.

Figure 8A:
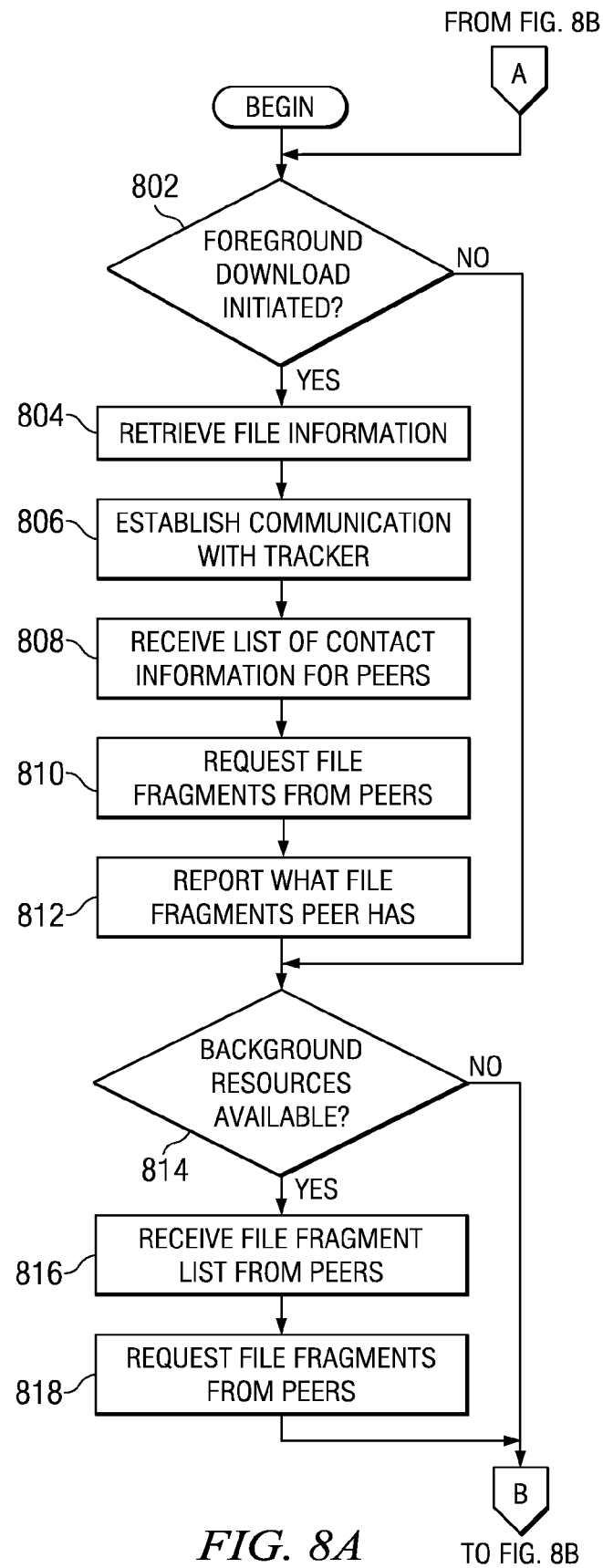
FIGS. 8A and 8B present a flowchart illustrating operation of a peer-to-peer file sharing client with background file sharing in accordance with an illustrative embodiment.
Figure 8B:
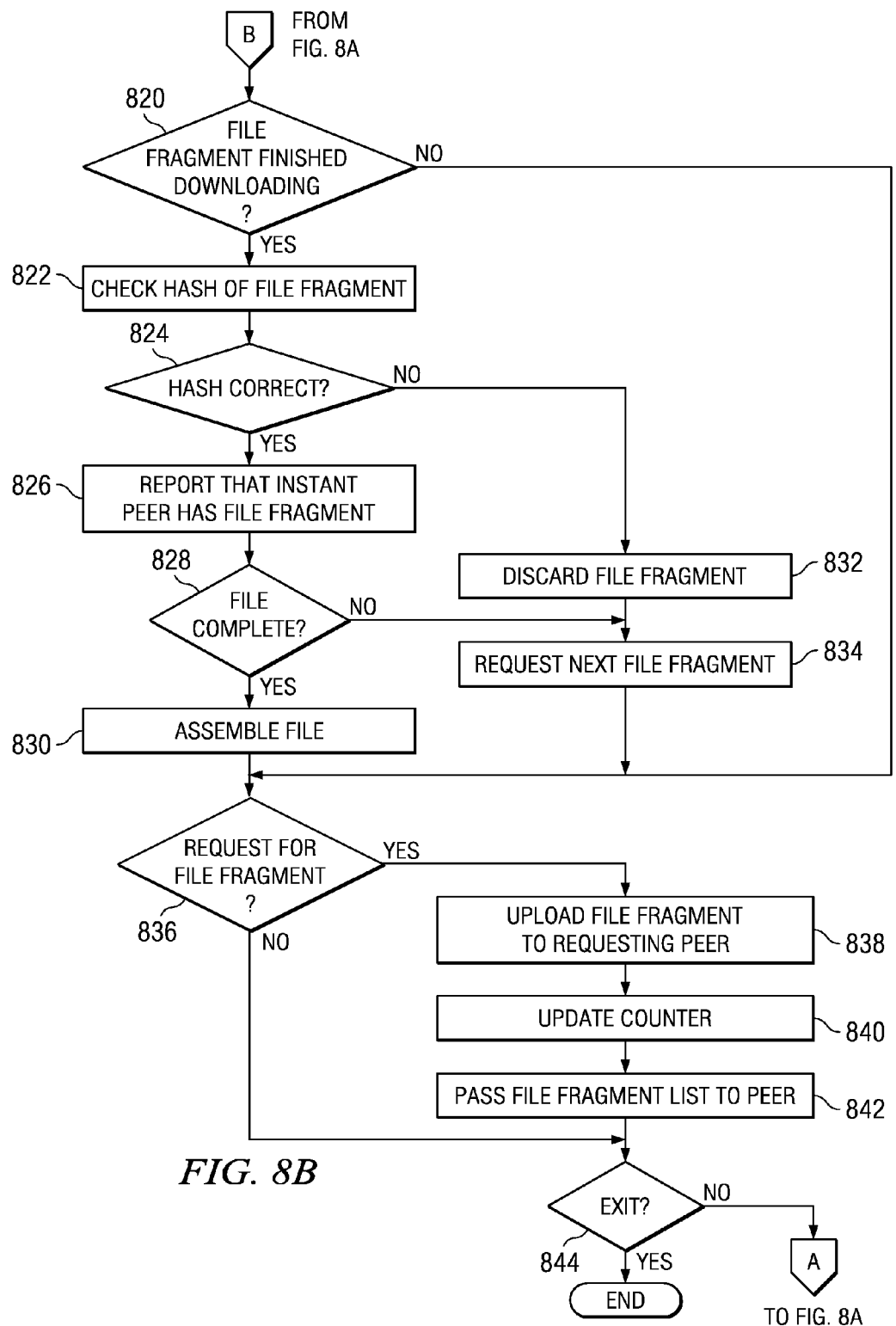

FIGS. 8A and 8B present a flowchart illustrating operation of a peer-to-peer file sharing client with background file sharing in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference to FIG. 8A, operation begins and the peer-to-peer (P2P) client determines whether a foreground download is initiated by the user (block 802). The user may initiate a foreground download, for example, by selecting a link to file information, such as a torrent. If the P2P client determines that a foreground download is initiated, the client retrieves the file information (block 804), establishes communication with the tracker (block 806), and receives a list of contact information for peers (block 808). Then, the P2P client requests file fragments from one or more of the peers (block 810). The P2P client reports to the peers in the swarm what file fragments it possesses (block 812).

Thereafter, or if the P2P client determines that a foreground download is not initiated in block 802, the P2P client determines whether storage space and bandwidth are available for background file sharing (block 814). If background storage and bandwidth resources are available, the P2P client receives file fragment list from peers (block 816). The P2P client may request a file fragment list from peers; however, the file fragment list may be piggybacked on file fragments in a foreground download. The file fragment list may be based on file name trading, files that each peer possesses, known rare file fragments or popular files, similar files within a swarm, or pattern matching, as described above. Alternatively, as described in further detail above, the P2P client may receive a list of file fragments based on rarity of file fragments, randomly selected file fragments, or file fragments with relative or comparable size to those being shared by the P2P client. In another alternative embodiment, the P2P client may receive the file fragment list from a central server or provider, as disclosed above. Given a list of file fragments that may be shared in the background, the P2P client requests file fragments from peers (block 818). The number of file fragments the P2P client may request to share in the background may be based on an amount of background storage space or bandwidth available, rarity of the file fragments, and so forth.

Thereafter, or if the P2P client determines that background storage or bandwidth resources are not available in block 814, the P2P client determines whether a file fragment is finished downloading (block 820). This may be a foreground file fragment or a background file fragment, because the P2P client will treat the downloading of individual file fragments the same. If a file fragment is finished downloading, the P2P client performs a hash on the file fragment (block 822) and determines whether the resulting hash value is correct (block 824). The P2P client determines whether the hash value is correct based on hash information received in block 804 or in the file fragment list received in block 816. If the hash value is correct, the P2P client reports to the peers in the swarm that it has the file fragment (block 826).

Thereafter, the P2P client determines whether download of the entire file is complete (block 828). It is likely that the P2P client will completely download a file if the file is part of foreground file sharing; however, it may be possible to download an entire file in background file sharing, especially if the P2P client is not currently participating in any foreground file sharing, for instance. If the file download is complete, the P2P client assembles the file (block 830).

Returning to block 824, if the hash is not correct for the file fragment, the P2P client discards the file fragment (block 832) and requests a next file fragment (block 834). In addition, although not illustrated here, the P2P client may automatically add the peer from which the file fragment was received to a blocked peer list after a specified number of invalid file fragments. With reference to block 828, if the file download is not complete, the P2P client requests a next file fragment (block 834).

After assembling the file in block 830 or requesting a next file fragment in block 834, or if the client determines that a file fragment is not finished downloading in block 820, the P2P client determines whether a request for a file fragment is received (block 836). This request may be for a file fragment being shared in the foreground or the background, because the P2P client may treat the uploading of file fragments the same regardless of whether the file fragment is being shared in the foreground or background. Alternatively, the P2P client may give precedence to requests for file fragments being shared in the foreground or may apply other techniques, such as satisfying requests in order of rarity, for example.

If a request is received for a file fragment, the P2P file sharing client uploads the requested file fragment to the requesting peer (block 838). Then, the P2P client may update a counter (block 840) to keep track of the rarity of file fragments or the popularity of files. The P2P client may also pass a file fragment list to the requesting peer (block 842). This file fragment list may include a list of the file fragments that the client possesses, a list of the rarest file fragments, a list of popular files, a correlation of files, or other file names or identifiers, as described in further detail above.

Thereafter, or if the P2P client determines that a request for a file fragment is not received in block 836, the P2P client determines whether an exit condition exists (block 844). An exit condition may exist, for example, if the user closes the P2P file sharing client, if the client device shuts down or loses connection to the P2P file sharing network, etc. If an exit condition exists, operation ends. Otherwise, if an exit condition does not exist in block 844, operation returns to block 802 to determine whether a foreground download is initiated.

A user may elect to "tag" a torrent when a new file is submitted to the peer-to-peer system, i.e. when the torrent is first created, when a user is in the process of downloading the file corresponding to the torrent, or when a user is sharing a fragment of the file in the background. A user may view the various tags with a torrent and their popularity (or tag count) at any time by simply providing the location of the torrent to the peer-to-peer client. Additionally, in a background peer-to-peer system, the user may view the tags associated with one or more file fragments that the user is hosting in the background. The user may view the tags for all fragments being shared in the background and search the tags.

FIG. 9 illustrates an example file fragment information display in accordance with an illustrative embodiment. When a user makes a request to view information about a file fragment being shared in the background, such as by selecting information control 628 in FIG. 6, for example, the P2P client may present information display 900. Information display 900 comprises display portion 910, which presents the filename, torrent information, and tags 911 that have been assigned to the file by users.

The peer-to-peer system may store metadata tags for the torrents in a central repository, such as a relational database, or in a distributed hash table. In order to provide tagging information for a particular file fragment in a background peer-to-peer client, the system may associate a file fragment with its corresponding torrent. The peer-to-peer client may create a key for a file fragment by concatenating a hash value and a position value that are received with the file fragment. The peer-to-peer client may then associate the key with the torrent in a database or hash table.

FIG. 10 illustrates a table that associates tags with a torrent in accordance with an illustrative embodiment. Table 1000 may be database table or a hash table. In the event a user wants to know the tags associated with a particular torrent, the P2P client may use a hash table to lookup tags by using the torrent file name as the key, as shown in table 1000. The torrent may be a full uniform resource locator (URL); however, in the illustrative embodiment, full URLs are not shown.

In practice, if a torrent file is renamed, then the tag information may be lost. Therefore, in another embodiment, unique identifiers of the torrent file may be used as the key for the hash table. That way, if the file is renamed, the tags are still associated with the file by the unique identifier.

When an entry of table 1000 is retrieved by using the key, a string of comma separated values is returned. In the example depicted in FIG. 10, the format of the string is, "<tag name>, <count>, . . . ", where the count is the number of times the torrent has been marked with that tag.

Figure 11:
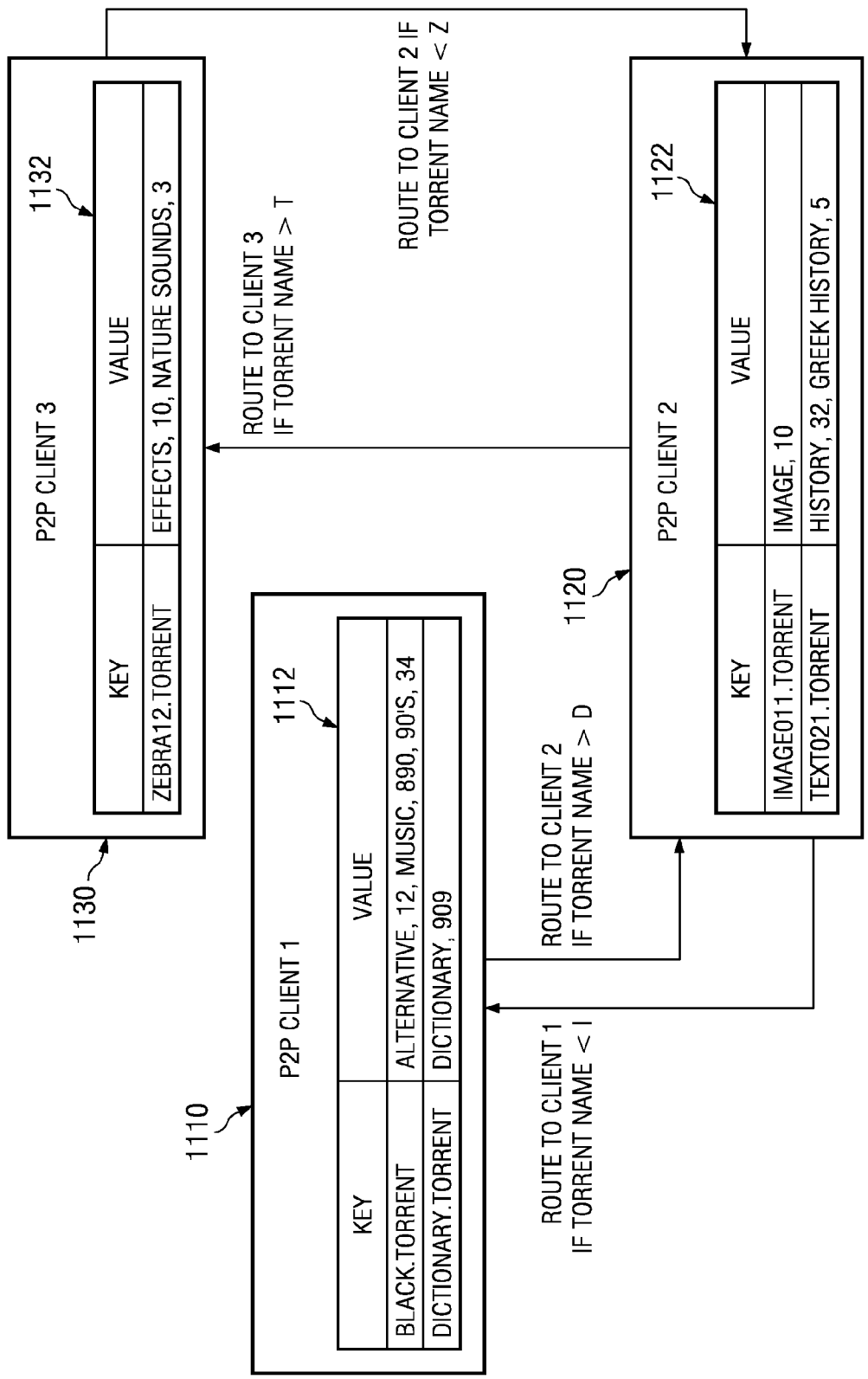
FIG. 11 depicts a distributed hash table that associates tags with torrents in accordance with an illustrative embodiment.

In one illustrative embodiment, entries of the hash tables may be distributed among all peers using a reliable distributed hash table algorithm and data structure. FIG. 11 depicts a distributed hash table that associated tags with torrents in accordance with an illustrative embodiment. P2P client 1 1110 stores hash table entries 1112. Here, hash table entries 1112 include torrent filenames that begin with "b" to "d." P2P client 2 1120 stores hash table entries 1122, which include torrent filenames that begin with the letter "i" to "t." Similarly, P2P client 3 1130 stores hash table entry 1132 that includes a torrent filename that begins with "z."

In the depicted example, the tag entries are distributed across three peers 1110, 1120, and 1130, which may use a simplified routing scheme based on the first letter of the torrent name. More complex routing schemes are used in the art and are not described here. If a P2P client asks P2P client 2 1120 for the tags associated with "Text021.torrent," P2P client 2 1120 returns "History, 32, Greek History, 5." However, if a P2P client asks P2P client 2 1120 for the tags associated with "Zebra12.torrent," P2P client 2 1120 routes the request to P2P client 3 1130.

More particularly, in the depicted example, P2P client 1 1110 routes all requests for torrent filenames with the first letter greater than "d" to P2P client 2 1120. P2P client 2 1120 routes all requests for torrent filenames with the first letter less than "i" to P2P client 1 1110 and routes all requests for torrent filenames with the first letter greater than "t" to P2P client 3 1130. P2P client 3 1130 routes all requests for torrent filenames with the first letter less than "z" to P2P client 2 1120.

If a new torrent filename is added, then the clients will decide which client will receive the filename. The clients may redistribute the entries in the distributed hash table. The routing may also change. For example, if a torrent "elephants.torrent" is added to the distributed hash table, the clients may decide to store the entry in table 1112 at client 1 1110, and the routing will be changed accordingly.

In one exemplary embodiment, if client 1 1110 receives a request for an entry "elephants.torrent" and there is no such entry in table 1112, then client 1 1110 forwards the request to client 2 1120. If there is no such entry in table 1122, then client 2 1120 returns the request to client 1 1110. Client 1 1110 may then determine that the entry does not exist and return an appropriate response.

FIG. 12 illustrates a table that associates torrents with a tag in accordance with an illustrative embodiment. Table 1200 may be database table or a hash table. In the event a user wants to know torrents are associated with a particular tag, the P2P client may use a hash table to lookup tags by using the tag name as the key, as shown in table 1200. The torrent filename may be a full uniform resource locator (URL); however, in the illustrative embodiment, full URLs are not shown.

A common use of social tagging is to navigate content based on tags. For example, a user may look at the tags for "zebra12.torrent," as shown in FIG. 9, for example, and then decide to look at the torrents associated with "Nature Sounds." The user may select the tag in tags 911 in information display 900, for example. In table 1200, the key space for the hash table is made up of tags and the values are locations of torrents. Table 1200 may be distributed among peers in a manner similar to the distributed hash table shown in FIG. 11.

FIG. 13 illustrates a table that associates file torrents with file fragments in accordance with an illustrative embodiment. Table 1300 may be database table or a hash table. In table 1300, the key space is made up of file fragment hashes concatenated with the position of the fragment in the file. It is common in the art for each file fragment to include a 160-bit secure hash algorithm (SHA1) hash in its header. Additionally, the header typically includes what position in the file the fragment is in. In the illustrative embodiment, a P2P client or tracker may combine or concatenate these numbers to create a key for the hash table to lookup the corresponding torrent. Of course, such keys would be far larger than seven digits as depicted in table 1300; the key values are shortened for illustrative purposes. In practice, hash table 1300 may be distributed so that it is shared among all peers, as previously described with respect to FIG. 11.

FIG. 14 is a flowchart illustrating operation of a peer-to-peer client when breaking a file into fragments for distributed file sharing in a segmented file sharing network in accordance with an illustrative embodiment. Operation begins and the P2P client breaks the file into a plurality of fragments (block 1402). The P2P client creates a hash value and determines a position value for each file fragment (block 1404). The P2P client then concatenates the hash value and position value to create a key (block 1406) and creates an entry in a hash table for each fragment associating the key with the torrent (block 1408). The hash table may be a table in a database or may be a distributed hash table. Thereafter, operation ends.

FIG. 15 is a flowchart illustrating operation of a peer-to-peer client for presenting file fragment information for a fragment being shared in the background in accordance with an illustrative embodiment. Operation begins and the user selects a background file fragment for which the user wishes to see file information (block 1502). The P2P client identifies the hash value and position value in the header of the file fragment (block 1504). The P2P client concatenates the hash value and the position value to create a key (block 1506). Using the key, the P2P client looks up the torrent filename in a hash table that associates torrents with file fragments (block 1508).

Using the torrent filename or unique identifier, the P2P client looks up the tags that have been assigned to the torrent in a hash table that associates tag names with torrents (block 1510). The P2P client presents the file fragment information, torrent, and tags to the user (block 1512). Thereafter, operation ends.

FIG. 16 is a flowchart illustrating operation of a peer-to-peer client for including torrents for background file sharing based on tag information in accordance with an illustrative embodiment. Operation begins and the user selects a tag (block 1602). The P2P client uses the tag to locate other torrents that are assigned the selected tag (block 1604). The P2P client may locate other torrents using a hash table that associates torrents with tag names, as shown in FIG. 12, for example. Then, the P2P client marks the other torrents for background file sharing (block 1606) and initiates sharing of file fragments in the other torrents in the background (block 1608). Thereafter, operation ends.

Alternatively, the user may select a tag and indicate that the user does not want to participate in sharing of files assigned to that tag. In this case, the P2P client may mark the tag, or torrents associated with the selected tag, as blocked, and the P2P client will not initiate or participate in background file sharing for those files.

Thus, the illustrative embodiments solve the disadvantages of the prior art by providing a peer-to-peer file sharing client with background file sharing in a segmented peer-to-peer file sharing network. Each file sharing participant may designate an amount of bandwidth and/or storage space for background file sharing. Peer-to-peer file sharing clients then share file data and content in the background automatically. The client may participate in additional swarms, in the background, to generally increase the number of peers in file sharing networks, thus increasing the speed of downloading desired files for other users.

A user may elect to "tag" a torrent when a new file is submitted to the peer-to-peer system, i.e. when the torrent is first created, when a user is in the process of downloading the file corresponding to the torrent, or when a user is sharing a fragment of the file in the background. A user may view the various tags with a torrent and their popularity (or tag count) at any time by simply providing the location of the torrent to the peer-to-peer client. Additionally, in a background peer-to-peer system, the user may view the tags associated with one or more file fragments that the user is hosting in the background. The user may view the tags for all fragments being shared in the background and search the tags.

The peer-to-peer system may store metadata tags for the torrents in a central repository, such as a relational database, or in a distributed hash table. In order to provide tagging information for a particular file fragment in a background peer-to-peer client, the system may associate a file fragment with its corresponding torrent. The peer-to-peer client may create a key for a file fragment by concatenating a hash value and a position value that are received with the file fragment. The peer-to-peer client may then associate the key with the torrent in a database or hash table.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Still further, the illustrative embodiments may take the form of a communications system comprising a transmitter that is configured to transmit program code for use by or in connection with a computer or any instruction execution system. For the purposes of this description, the transmitter may comprise, for example, a wireless router, a wireless access point, a wireless transmitter, a radio transmitter, a relay device, or any other transmission device that is configured to communicate, propagate, or transport the program for use by or in connection with the instruction execution system, apparatus, or device. For example, the communications system may be a relay that receives a wired or wireless transmission and propagates the transmission to another point in a communications network. The communications system may further comprise a memory that stores the computer readable program to be transmitted. The memory may be a transitory memory device, such as a volatile memory, serving as a buffer to temporarily store the computer readable program while it is being queued for transmission. Alternatively, the memory may be a more permanent memory device, such as a non-volatile memory, hard disk drive, or the like. The communications system may further comprise a receiver to receive the computer readable program before propagating or relaying transmission to another node in the network.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a peer-to-peer file sharing client data processing system for background file sharing in a peer-to-peer file sharing network, the method comprising:
   allocating background resources in the peer-to-peer file sharing client data processing system for background file sharing comprising a specified amount of bandwidth and a specified amount of storage space to be used for background file sharing;
   growing a background swarm by requesting, by the peer-to-peer file sharing client data processing system, at least one file fragment for a file from the background swarm for background file sharing such that the at least one file fragment becomes available to be distributed from the peer-to-peer file sharing client data processing system to peer data processing systems in the background swarm;
   receiving, by the peer-to-peer file sharing client data processing system, the at least one file fragment from the background swarm for background file sharing of a file using at least a portion of the specified amount of bandwidth;
   temporarily storing, by the peer-to-peer file sharing client data processing system, the at least one file fragment in at least a portion of the specified amount of storage space;
   for a given file fragment within the at least one file fragment, identifying a key value;
   looking up file information for the given file fragment using the key value, wherein the file information includes tags assigned to the file; and
   presenting the file information to a user,
   wherein the at least one file fragment is part of a file that is not being downloaded in the foreground.

2. The method of claim 1, wherein the given file fragment has an associated hash value and a position value that represents the given file fragment's position within the file.

3. The method of claim 2, wherein identifying a key value comprises concatenating the hash value and the position value to form the key value.

4. The method of claim 1, wherein looking up file information comprises looking up a torrent name in a torrent table using the key value as a key.

5. The method of claim 4, wherein the torrent table is a distributed hash table that is distributed among a plurality of peer-to-peer clients.

6. The method of claim 4, wherein looking up file information further comprises looking up tag information in a tag table using the torrent name as a key.

7. The method of claim 6, wherein the tag table is a distributed hash table that is distributed among a plurality of peer-to-peer clients.

8. The method of claim 6, wherein the tag information comprises one or more tags and one or more count values, wherein each tag has a respective count value.

9. The method of claim 1, further comprising:
   responsive to the user selecting a given tag within the tags assigned to the file, looking up torrent information in a tag-to-torrent table using the tag as a key; and
   presenting the torrent information to the user.

10. A peer-to-peer file sharing client for background file sharing in a peer-to-peer file sharing network, the peer-to-peer file sharing client comprising:
    a processor; and
    a memory coupled to the processor, wherein the memory contains instructions which, when executed by the processor, cause the processor to:
    allocate background resources in the peer-to-peer file sharing client for background file sharing comprising a specified amount of bandwidth and a specified amount of storage space to be used for background file sharing;
    grow a background swarm by requesting at least one file fragment for a file from the background swarm for background file sharing such that the at least one file fragment becomes available to be distributed from the peer-to-peer file sharing client to peer data processing systems in the background swarm;
    receive the at least one file fragment from the background swarm for background file sharing of a file using at least a portion of the specified amount of bandwidth;
    temporarily store the at least one file fragment in at least a portion of the specified amount of storage space;
    for a given file fragment within the at least one file fragment, identify a key;

look up file information for the given file fragment using the key, wherein the file information includes tags assigned to the file; and present the file information to a user, wherein the at least one file fragment is part of a file that is not being downloaded in the foreground.

11. The peer-to-peer file sharing client of claim 10, wherein the given file fragment has an associated hash value and a position value that represents the given file fragment's position within the file and wherein identifying a key value comprises concatenating the hash value and the position value to form the key value.

12. The peer-to-peer file sharing client of claim 10, wherein looking up file information comprises looking up a torrent name in a torrent table using the key value as a key.

13. The peer-to-peer file sharing client of claim 12, wherein looking up file information further comprises looking up tag information in a tag table using the torrent name as a key.

14. The peer-to-peer file sharing client of claim 13, wherein the tag information comprises one or more tags and one or more count values, wherein each tag has a respective count value.

15. The peer-to-peer file sharing client of claim 10, wherein the instructions, when executed by the processor, further cause the processor to:

responsive to the user selecting a given tag within the tags assigned to the file, look up torrent information in a tag-to-torrent table using the tag as a key; and present the torrent information to the user.

16. A computer program product comprising a non-transitory computer readable storage medium having a computer readable program stored therein, wherein the computer readable program, when executed on a peer-to-peer file sharing client data processing system, causes the peer-to-peer file sharing client data processing system to:

allocate background resources in the peer-to-peer file sharing client data processing system for background file sharing comprising a specified amount of bandwidth and a specified amount of storage space to be used for background file sharing;

grow a background swarm by requesting at least one file fragment for a file from the background swarm for background file sharing such that the at least one file fragment becomes available to be distributed from the peer-to-peer file sharing client data processing system to peer data processing systems in the background swarm;

receive the at least one file fragment from the background swarm for background file sharing of a file using at least a portion of the specified amount of bandwidth;

temporarily store the at least one file fragment in at least a portion of the specified amount of storage space;

for a given file fragment within the at least one file fragment, identify a key;

look up file information for the given file fragment using the key, wherein the file information includes tags assigned to the file; and present the file information to a user, wherein the at least one file fragment is part of a file that is not being downloaded in the foreground.

17. The computer program product of claim 16, wherein the given file fragment has an associated hash value and a position value that represents the given file fragment's position within the file and wherein identifying a key value comprises concatenating the hash value and the position value to form the key value.

18. The computer program product of claim 16, wherein looking up file information comprises looking up a torrent name in a torrent table using the key value as a key and looking up tag information in a tag table using the torrent name as a key.

19. The computer program product of claim 18, wherein the tag information comprises one or more tags and one or more count values, wherein each tag has a respective count value.

20. The computer program product of claim 16, wherein the computer readable program, when executed on the peer-to-peer file sharing client data processing system, further causes the peer-to-peer file sharing client data processing system to:

responsive to the user selecting a given tag within the tags assigned to the file, look up torrent information in a tag-to-torrent table using the tag as a key; and present the torrent information to the user.

* * * * *